United States Patent
Gapontsev et al.

(10) Patent No.: US 9,036,249 B2
(45) Date of Patent: May 19, 2015

(54) METHOD OF SUM-FREQUENCY CONVERSION AND FREQUENCY CONVERTER WITH OPTICAL ACTIVE ROTATOR

(71) Applicants: Valentin Gapontsev, Worcester, MA (US); Valentin Tartyshnyy, Fryzaino (RU); Oleg Vershinin, Fryazino (RU); Boris Davidov, Fryazino (RU); Dmitri Oulianov, Moscow (RU)

(72) Inventors: Valentin Gapontsev, Worcester, MA (US); Valentin Tartyshnyy, Fryzaino (RU); Oleg Vershinin, Fryazino (RU); Boris Davidov, Fryazino (RU); Dmitri Oulianov, Moscow (RU)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 13/747,447

(22) Filed: Jan. 22, 2013

(65) Prior Publication Data
US 2013/0188242 A1     Jul. 25, 2013

Related U.S. Application Data

(60) Provisional application No. 61/589,085, filed on Jan. 20, 2012.

(51) Int. Cl.
*G02F 1/35*     (2006.01)

(52) U.S. Cl.
CPC .............. *G02F 1/353* (2013.01); *G02F 1/3534* (2013.01); *G02F 2001/354* (2013.01)

(58) Field of Classification Search
CPC .. G02F 1/353; G02F 1/3534; G02F 2001/354

USPC ................................ 359/326–332; 372/21–22
See application file for complete search history.

(56) References Cited

U.S. PATENT DOCUMENTS

| | | | |
|---|---|---|---|
| 4,331,891 A * | 5/1982 | Rizzo | ............................. 359/329 |
| 5,278,852 A | 1/1994 | Wu et al. | |
| 6,441,949 B1 | 8/2002 | Reynolds et al. | |
| 2008/0259973 A1 * | 10/2008 | Kim et al. | ........................ 372/20 |
| 2009/0027753 A1 | 1/2009 | Lizotte | |
| 2011/0103413 A1 | 5/2011 | Kafka et al. | |

FOREIGN PATENT DOCUMENTS

KR     100809271 B1     2/2008

OTHER PUBLICATIONS

International Search Report, dated May 13, 2013.

* cited by examiner

*Primary Examiner* — Daniel Petkovsek
(74) *Attorney, Agent, or Firm* — Yuri Kateshov, Esq.; Timothy J. King, Esq.

(57) ABSTRACT

A method for sum-frequency conversion of coherent radiation includes generating two linearly polarized waves at different first $f_1$ and second $f_2$ frequencies ($f_2>f_1$), respectively, which coaxially propagate and are characterized in common case by arbitrarily located polarization planes. The waves are further guided through an optical active crystal which rotates their polarization planes at different angles $\psi_1$ and $\psi_2$ determined as $\omega_1=\rho(f_1)\cdot L$ and $\psi_2=\rho(f_2)\cdot L$, where L is a length of the optical active crystal, and $\rho(f_1)$ and $\rho(f_2)$ specific rotations at respective frequencies $f_1$ and $f_2$. Finally the waves with the rotated polarization planes are incident on a non-linear crystal configured to generate a third frequency.

8 Claims, 1 Drawing Sheet

METHOD OF SUM-FREQUENCY CONVERSION AND FREQUENCY CONVERTER WITH OPTICAL ACTIVE ROTATOR

BACKGROUND OF THE DISCLOSURE

Currently, there is a growing demand for high power ultraviolet (UV) pulsed lasers for various industrial applications such as LED scribing, chip dicing, via-hole drilling, plastics marking and others. In comparison with more common IR lasers, UV lasers have an advantage of higher linear and nonlinear absorption of the UV light by some materials and their possibility to achieve smaller focus spots. The majority of commercially available pulsed UV lasers are diode pumped solid state Nd:YVO$_4$, Nd:YAG, or Nd:YLF lasers or Yb-doped fiber master oscillator power amplifier (MOPA) lasers operating near 1 μm wavelength with inter- or intra-cavity frequency tripling or quadrupling.

The conventional way of third harmonic generation (THG) employed in most of the UV lasers operating near 0.35 μm consists of a two stage process: second harmonic generation (SHG) in a type-I phase-matched nonlinear optical crystal and sum frequency generation of the fundamental and second harmonics in a type-II phase-matched crystal. Usually LiB$_3$O$_5$ (LBO) crystals are used for both processes due to their high damage threshold, high nonlinearity, low absorption in visible and UV ranges, and high crystal growth yield. The popularity of the described scheme can be explained by its ease of implementation: in the output of the first nonlinear crystal the fundamental and double frequency waves are polarized in the orthogonal planes which is exactly what is required for type-II phasematching condition in the second nonlinear crystal. Because of that there is no wave manipulation needed between the nonlinear crystals except for focusing of the waves.

The alternative way of THG is to use type-I phase-matched crystals for both processes. Compared to the above-discussed technique, this one is associated with higher conversion efficiency of sum-frequency generation under type-I phasematching condition. For example, the total conversion efficiency is about 2.2 times higher in the type-I phase-matched LBO crystal than the one in the type-II crystal at 355 nm wavelength at 100° C. In addition, there is no spatial walk-off of the fundamental and second harmonic waves in the type-I phase matching scheme, which removes the crystal length limitation present in type-II phasematching. There is, however, non-zero spatial walk-off of the third harmonic wave with respect to the fundamental and the second harmonic waves. This effect leads to some ellipticity of the 355 nm output wave, which is considered to be a minor problem and could be compensated, for example, by an anamorphous prism arrangement. Thus due to higher nonlinearity and the absence of crystal length limitation, THG in a type-I LBO crystal is significantly more efficient. This is especially important for devices with low IR pump peak powers, such as fiber lasers. Higher efficiency also decreases a rate of crystal degradation by relaxing the focusing conditions in the THG crystal.

The peculiarity of the type-I phase-matching scheme, however, is the fact that both fundamental and double frequency waves must be polarized in the same plane. That means that a polarization control element is required after the first nonlinear crystal. Usually a birefringent phase plate is inserted between the nonlinear crystals for that purpose. This birefringent phase plate should simultaneously provide a half wavelength phase shift to the fundamental wave and a whole wavelength phase shift to the second harmonic wave. If the phase axis of such a birefringent phase plate is oriented at 45° with respect to the polarization plane of the fundamental wave, the birefringent phase plate will flip the fundamental wave polarization at 90° degrees, while the polarization of the second harmonic wave will remain unchanged. As a result, the polarizations vectors of the fundamental and second harmonic waves become parallel.

As one of ordinary skill in the geometric optics is well aware, the use of the birefringent phase plate may be problematic. One of the known problems includes the dependence of the phase shift from temperatures fluctuations which typically leads to the third harmonics power instability. Another problem sterns from resonant wavelength dependence that requires very high precision manufacturing of the phase plate, which, in turn, drives the cost up. Still another problem relates to the requirement of precise angular adjustment around the wave propagation axis relative to the polarization plane which complicates the birefringent phase plate installation.

As also known to one of ordinary skill, because of the dispersion of the difference of the ordinary and extraordinary indexes of refraction $|n_o - n_e|$, it is impossible to make a birefringent phase plate which ideally works at both fundamental and second harmonic wavelengths. As a result the required birefringent phase plate will have a considerable thickness and therefore it will have a higher thermal dependence. For example, in order to get an acceptable angular mismatch between the fundamental and second harmonic waves polarization planes of $\Delta\delta \approx 0.3°$ one has to use a 91th order 5.55 mm thick quartz phase plate. A simple calculation shows that the temperature change from 0 to 50° C., which is a typical industrial applications operation temperature range, leads to a prohibitively high change of the polarization planes angular mismatch of $\Delta\delta = 110°$.

Based on the foregoing, a need therefore exists for a frequency converter configured with an optical active crystal avoiding problems associated with the above-discussed birefringent phase plate.

A further need exists for a method of sum-frequency conversion utilizing the disclosed optical active crystal which is carrying out a role of a thermo-stable non-resonance rotator of polarization planes.

SUMMARY OF THE DISCLOSURE

These needs are met by the disclosed structure operative to generate a third or higher harmonic of fundamental frequency by utilizing an optical active crystal which is configured to install necessary angles between polarization planes of two waves required for a type-I phase or type-II phase matched crystal.

In accordance with one aspect of the disclosure, the disclosed method for sum-frequency conversion of coherent radiation includes propagating two coaxial waves polarized in respective first and second non-coinciding planes at different first $f_1$ and second $f_2$ frequencies, respectively. The waves are guided through an optical active crystal so as that their respective polarizations are simultaneously rotated at different angles $\Psi_1$ and $\Psi_2$, respectively. Then the waves are incident on a nonlinear crystal which is configured to realize the sum-frequency conversion of the two frequencies f1 and f2 into a third frequency. The angles at which the polarization planes of the respective waves are rotated are determined as $\Psi_1 = \rho(f_1) \cdot L$ and $\Psi_2 = \rho(f_2) \cdot L$, where L is a length of the optical active crystal, and $\rho(f_1)$ and $\rho(f_2)$ specific rotations of the polarization planes at respective frequencies $f_1$ and $f_2$.

In a further aspect of the disclosure, the disclosed frequency converter is configured with an upstream optical active crystal operative to simultaneously rotate polarization planes of two coaxial waves at different angles $\Psi_1$ and $\Psi_2$, which are polarized in different planes with arbitrary acute angle $\psi$ between them and have different frequencies $f_1$ and $f_2$. The disclosed converter further includes a downstream nonlinear crystal realizing sum-frequency conversion of these two frequencies (f1) and (f2) of respective coaxial first and second waves into a third frequency.

BRIEF DESCRIPTION OF THE DRAWINGS

The above and other features and advantages will become more readily apparent from the following specific description accompanied by drawings, in which.

SPECIFIC DESCRIPTION

Figure 1A:
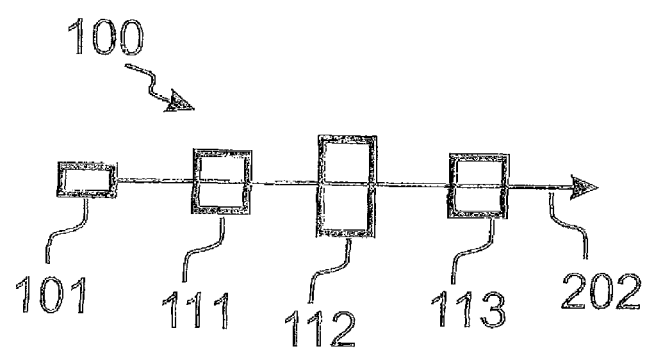
FIG. 1A is an optical schematic of the disclosed frequency converter operative to generate a third harmonic.

Wherever possible, same or similar reference numerals are used in the drawings and the description to refer to the same or like parts or steps. The drawings are in simplified form and are far from precise scale. For purposes of convenience and clarity only, directional terms may be used with respect to the plane of the drawing sheets and not be construed to limit the scope. Unless specifically noted, it is intended that the words and phrases in the specification and claims be given the ordinary and accustomed meaning to those of ordinary skill in the fiber laser arts.

Referring to FIG. 1A, a converter 100 illustrates a general concept of the present disclosure. As one of ordinary skill knows, the frequency tripling is the phenomenon in accordance with which a non-linear crystal generates an output beam with a frequency which is three times that of the fundamental frequency. The process of frequency tripling is usually realized as a multi-step process including frequency doubling of the fundamental frequency and subsequent summation of the fundamental and second harmonic frequencies in the non-linear crystal.

Accordingly, a source 101 is operative to emit a linearly polarized single mode ("SM") beam outputted by a laser and propagating along a path at a fundamental frequency. The SM beam is incident on an non-linear crystal 111 which is the type-I phase matching crystal converting the fundamental frequency into its second harmonic. As a result two waves at the fundamental and second harmonic frequencies, respectively, are orthogonally linearly polarized and propagate further as coaxial waves along the path.

As one of ordinary skill knows, to obtain the third harmonic in the type-I phase matching crystal, the planes of the fundamental and second harmonic frequencies should be parallel. Since the polarization planes of the different frequencies waves downstream from upstream non-linear crystal 111 are orthogonal, both planes have to necessarily coincide with one another which is realized by simultaneous spatial rotating of these planes at different angles.

A rotator 112 located along the path of the orthogonally polarized waves is configured to realize such a rotation. In contrast to the known prior art, rotator 112 is configured as an optical active crystal, i.e., the crystal capable of rotating the polarization planes. More particularly, rotator 112 is configured as the active optical uniaxial crystal of $SiO_2$ (e.g., quartz), or uniaxial crystal of $LiIO_3$, or uniaxial crystal of $TeO_2$, etc. Specific optical activity ρ (polarization rotation angle per unit length of optical active crystal) in active optical crystal 112 has a strong wavelength dependence (it is monotonically decreases as the wavelength increases in the near IR-visible-UV ranges). As a result, if both waves at fundamental and second harmonic frequency, respectively, are propagating through optical active uniaxial crystal 112 in the optical axis direction, their polarization planes will rotate with different speeds and will exactly coincide at a certain angular position. The minimal length $L_{min}$ of the optical active crystal necessary to get the fundamental and second harmonic beams polarizations aligned may be calculated by the following formula:

$$L_{min} = 90°(\rho_{SH} - \rho_{FW}) \quad (1)$$

Where $\rho_{SH}$ and $\rho_{FW}$ are specific optical activities at second harmonic (SH) and fundamental wavelength (FW), respectively.

Returning to FIG. 1A, two equally polarized coaxial waves are further incident on a type-I phase matching nonlinear crystal 113 configured to sum the frequencies of the these waves so as to generate a third harmonic propagating. The type-I phase matching non-linear crystals 111 and 113 may be grown from the same or different materials. For example, these crystals each include Lithium Triborate ("LBO"). The SM output converted beam 202 is emitted at the triple frequency.

Figure 1B:
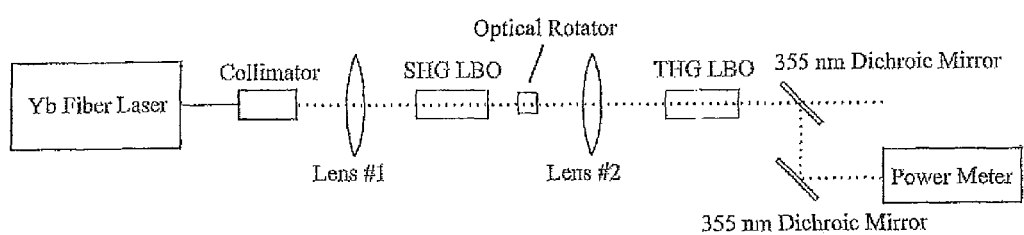
FIG. 1B is an exemplary optical scheme of the frequency converter of FIG. 1.

Turning now to FIG. 1B, a specific embodiment of FIG. 1A includes an Yb-fiber laser used as a pump source. The emitted SM is emitted at about 1064 nm and further propagates through a collimator and a focusing lens 1. The focused beam is incident on a first type-I phase matching harmonic generator non-linear crystal SHG LBO. The harmonic generator SHG configured on the basis of LBO-crystal reduces the wavelength of from λ=1064 nm to λ=535 nm polarized in respective orthogonal planes. Thereafter, the polarization planes of the waves are rotated in the optical rotator, which is an active optical crystal, at the respective different angles to coincide with one another. Upon further focusing in lens 2, a downstream third harmonic generator THG based on LBO crystal generates a wave at λ=355 nm. Three waves including respective fundamental, second and third harmonic frequencies are further incident on a dichroic mirror which taps off the desired 355 nm wave to a power meter.

The following table exemplifies the required minimal crystal length $L_{min}$, polarization rotation angles $\psi$, $\psi_{SH}$ and specific optical activity $\rho_{FW}$, $\rho_{SH}$ for $SiO_2$ (quartz) and $TeO_2$ crystals at λ=1064 and λ=532 nm, respectively.

| Optical active crystal | $L_{min}$ (mm) | $\psi_{FW}/\psi_{SH}$ (deg) | $\rho_{FW}$ (deg/mm) (λ = 1064 nm) | $\rho_{SH}$ (deg/mm) λ = 532 nm |
|---|---|---|---|---|
| $SiO_2$ | 4.39 | 27.66 | 6.3 | 26.8 |
| $TeO_2$ | 0.766 | 19.84 | 25.9 | 143.4 |

As disclosed above, the schemes of FIGS. 1A and 1B are based on type-I-phase matching nonlinear crystals which transform the equally polarized waves. However, the polarization planes of these waves may be oriented relative each other at an arbitrary acute angle IP satisfying to a condition 0°≤Ψ≤90°. In this case, the conversion also may be realized on either the type-I- or type-II-phase matching crystal.

If the sum-conversion occurs in the type-I-phase matching nonlinear crystal, then the minimal length $L_{min}$ of optical active crystal 112 is determined in two ways:

if the polarization plane of the fundamental wave is ahead of the polarization plane of the harmonic wave in the beginning of the rotation (in other words the harmonic polarization plane catches up with the fundamental polarization plane and then overtakes it in the process of rotation), then $$L_{min} = \Psi/\Delta\rho \quad (2),$$

where $\Delta\rho = (\rho_{HH} - \rho_{FW})$ is the difference between specific rotations of respective polarization planes of waves at respective fundamental wavelength (FW) and arbitrary higher harmonic (HH), and $\rho_{HH}$ is more $\rho_{FW}$ ($\rho_{NH} > \rho_{FW}$), e.g. the optical active crystal is characterized by a normal dispersion of the specific rotation.

if the opposite disposition of the polarization planes takes place at the same direction of rotation, then $$L_{min} = (180° - \Psi)/\Delta\rho \quad (3)$$

If the sum-frequency occurs in the type-II phase matching nonlinear crystal, the minimal length $L_{min}$ of the optical active crystal is determined also in two ways:

if again the polarization plane of the fundamental wave is ahead of the polarization plane of the harmonic wave in the beginning of a rotation, then $$L_{min} = (90° + \Psi)/\Delta\rho \quad (4)$$

if the opposite disposition of the polarization planes takes place at the same direction of rotation, then $$L_{min} = (90° - \Psi)/\Delta\rho \quad (5)$$

Note that above-disclosed scheme can be utilized for frequency summation of other than the fundamental frequency and its harmonics. The described scheme operates for the summation of any frequencies, for example fourth and fifth harmonics of the fundamental frequency.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

The invention claimed is:

1. A single pass frequency converter, comprising:
    an upstream phase-matched nonlinear crystal operative to convert a linearly polarized beam at a fundamental frequency $f_1$ to a linearly polarized beam at a second frequency $f_2$, which is higher than the fundamental frequency $f_1$, and output the beams at respective fundamental and second frequencies in respective polarization planes which define a sharp angle $\psi$ therebetween, wherein $0° < \psi < 90°$;
    an optically active crystal impinged upon by the beams and operative to simultaneously rotate polarization planes at different angles $\Psi_1$ and $\Psi_2$ to output the beams so that the polarization planes are parallel to one another; and
    a downstream type-I phase matched nonlinear crystal realizing sum-frequency conversion of fundamental and second frequencies (f1) and (f2), respectively, into a third frequency $f_3$ which is different from f1 and f2.

2. The frequency converter of claim 1, wherein the active crystal is configured with a minimal length L necessary for the polarization planes of the respective beams to rotate so as to be parallel one another, determined as $$L_{min} = \psi/\Delta\rho,$$

if the polarization plane of the beam at the fundamental frequency begins to rotate in one direction ahead of a rotation of the polarization plane of the beam at the second frequency in the one direction, or as $$L_{min} = (180° - \psi)/\Delta\rho$$

if the polarization plane of the beam at the second frequency begins the rotation in the one direction ahead of the rotation of the polarization plane of the beam at the fundamental frequency in the one direction,
    where $\Delta\rho = (\rho_2 - \rho_1)$ is a difference between specific rotations of the polarization planes of at respective second and fundamental frequencies, and $\rho_2$ is more than $\rho_1$ ($\rho_2 > \rho_1$).

3. The frequency converter of claim 2, wherein the active crystal is configured with a length L determined as $L = (90° \pm \Psi)/\Delta\rho$ depending on a rotational direction of the polarization planes.

4. The frequency converter of claim 1, wherein the active crystal comprises quartz, $LiIO_3$, TeOi.

5. The frequency converter of claim 1, wherein the upstream and downstream non-linear crystals each include Lithium Triborate (LBO, $LiB3O5$).

6. The frequency converter of claim 1, wherein the upstream nonlinear crystal is a type-I crystal.

7. The frequency converter of claim 1 further comprising a single mode fiber laser outputting a linearly polarized beam at the fundamental frequency $f_1$.

8. The frequency converter of claim 1, wherein the beams at respective fundamental and second frequencies propagate between the upstream nonlinear and active crystals unhindered.

* * * * *